Figure 1:
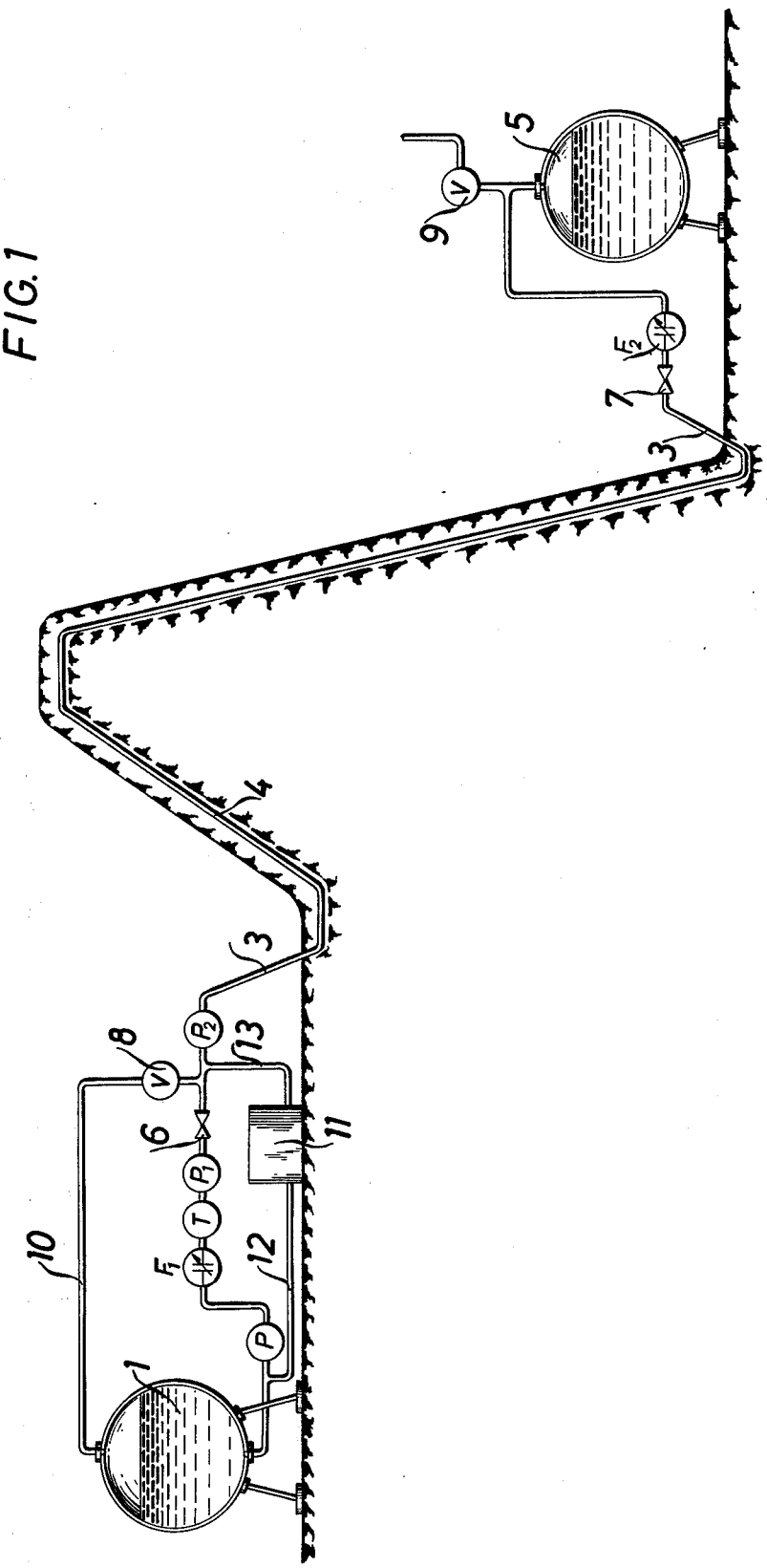

United States Patent [19]

Drescher et al.

[11] 3,958,449

[45] May 25, 1976

[54] PROCESS AND APPARATUS FOR TESTING PIPELINES FOR LEAKS

[75] Inventors: Georg Drescher, Erftstadt Liblar; Karl-Heinz Uhle, Bruhl, both of Germany

[73] Assignee: Hoechst Aktiengesellschaft, Frankfurt am Main, Germany

[22] Filed: Apr. 29, 1975

[21] Appl. No.: 572,839

[30] Foreign Application Priority Data

May 9, 1974    Germany............................ 2422561

[52] U.S. Cl............................................. 73/40.5 R
[51] Int. Cl.$^2$......................................... G01M 3/30
[58] Field of Search...................................... 73/40.5

[56] References Cited
UNITED STATES PATENTS

| | | | |
|---|---|---|---|
| 571,725 | 11/1896 | Howe | 73/40.5 |
| 1,196,828 | 9/1916 | Weatherson | 73/40.5 |
| 2,979,939 | 4/1961 | Shuh | 73/40.5 |

*Primary Examiner*—S. Clement Swisher
*Attorney, Agent, or Firm*—Connolly and Hutz

[57] ABSTRACT

Liquid-conveying pipelines are tested for leaks during inoperative periods. To this end, the pipeline is hermetically closed at its two ends and the pressure prevailing in the interior of the pipeline is continuously measured. Once the pressure prevailing therein is found to drop, a substitute liquid is conveyed through the pipeline in the quantity necessary to make up for that decrease in volume of the normally conveyed liquid which is caused by the relevant temperature drop, an alarm device is actuated if the pressure continues to drop, and the magnitude of the leak is ascertained as an inference from the quantity of substitute liquid introduced per unit time into the closed pipeline.

7 Claims, 2 Drawing Figures

PROCESS AND APPARATUS FOR TESTING PIPELINES FOR LEAKS

The present invention relates to a process permitting liquid-conveying pipelines to be tested for leaks, during inoperative periods, and to an apparatus for carrying out the process.

As disclosed in "Siemens-Zeitschrift" 47 (1973), No. 6, pages 434–436, it is known that pipelines can be monitored for leaks during operative (i.e. liquid-conveying) periods by means of turbocounters, of which one is disposed near the inlet, and the other near the outlet, of the pipeline. The pipeline is liquid-tight if the quantities of material (corrected to allow for the temperature difference along the length of the pipeline) recorded at its two ends are identical. The quantities of material recorded have to be compared several times per hour, and if they differ unreasonably from a value which allows for the variations attributable to the measurement converters, counters and analogue-to-digital converters employed, it is necessary for the movement of material through the pipeline to be stopped on the ground of suspected leaks. The (slide) valves defining the beginning and end of each of the various sections into which the length of the pipeline is divided are all closed, and the static pressure prevailing in the pipeline sections between consecutive valves is determined. Upon the detection of changes in the nominally static pressure in the individual pipeline sections, it is possible for conclusions to be drawn as to the existence or non-existence of leaks in the pipeline. (This is known in the art as the "Static pressure method").

It is also possible for a pipeline to be tested for leaks during inoperative periods. To this end, the pipeline is hermetically closed at both ends, pressure is applied within it, and all of the above-mentioned section-defining (slide) valves are closed. The pipeline is liquid-tight if the pressure found to prevail in its individual sections remains constant. Appreciable pressure variation, however, has been found to occur in all those cases in which the pipeline sections are irregularly cooled due to different ambient temperatures. A temperature difference of even 0.1°C, for example, may produce a pressure difference as high as 1 bar. The difference between the pressures prevailing in two adjacent pipeline sections, however, remains constant once the respective liquid and ambient temperatures have equalized. It is then possible for the pipeline to be tested for leaks by determining the difference between the gradients of the differential pressure prevailing in two adjacent pipeline sections. In a leaky section, the pressure decreases to an increasing extent. The test data curves so obtained hardly permit conclusions to be drawn as to the presence of leaks, and it is therefore good practice to plot $d(\Delta p)/dt$ against time, and in this manner to determine simultaneously the magnitude of the leak. (This is known as the "differential pressure method").

Whereas the static pressure method is useful for determining leakages of at least 500 l/h, it is possible for the differential pressure method to be used for identifying leaks as small as 10 l/h. About 15 minutes are necessary for applying the static pressure method, whereas very long periods of time are necessary for applying the differential pressure method. In other words, the two methods are not very suitable for testing pipelines for leaks during inoperative periods, as they are either insufficiently sensitive or require too much time.

The present invention now provides a process and an apparatus permitting a liquid-conveying pipeline to be tested for leaks, which avoid the adverse effects mentioned above, enable the pipeline to be monitored continuously with little expenditure, and enable leaks down to several liters per hour to be reliably detected.

The process of the present invention comprises hermetically closing the pipeline at its two ends; continuously measuring the pressure prevailing in the interior of the pipeline; introducing into the closed pipeline, upon the pressure prevailing therein being found to drop, a substitute liquid similar to that normally conveyed therethrough, the substitute liquid being introduced in the quantity necessary to make up for that decrease in volume of the normally conveyed liquid which is caused by the relevant temperature drop, and an alarm device being actuauted if the pressure continues to drop; and, upon the actuation of the alarm device, ascertaining the size of the leak as an inference from the quantity of substitute liquid introduced per unit time into the closed pipeline.

The process of the present invention is particularly well suited for use in the testing for leaks of pipelines which are partially buried within the earth and partially carried by supporting bridges, and which are used for conveying substances having a high vapour pressure, e.g. ethylene (b.p.: − 104°C), propylene (b.p.: −47°C), ammonia (b.p.: −33°C), vinyl chloride (b.p.: −14°C) or acetaldehyde (b.p.: +21°C).

The problem is encountered with these substances that an escape of liquid from the pipeline produces only a minor change in pressure in all those cases in which the pressure prevailing at the highest level of the pipeline falls below the vapour pressure of the particular substance conveyed therethrough; thus it is impossible for relatively small leaks to be detected within reasonable periods of time by measurement of the pressure alone, even though the relevant temperature changes are considered in connection therewith.

Figure 2:
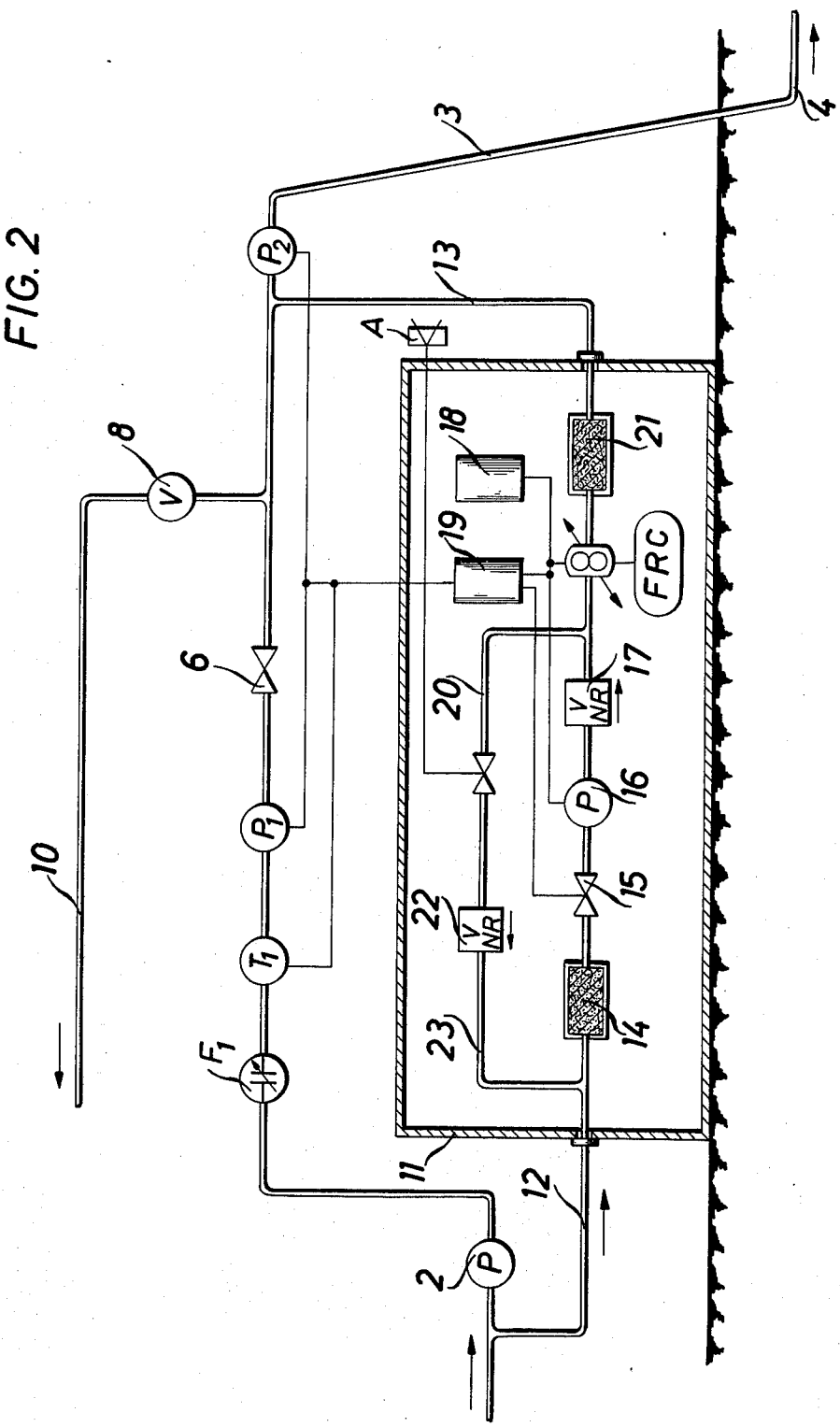

One embodiment of an apparatus for carrying out the process of the present invention will now be described by way of example with reference to the accompanying drawings, in which FIG. 1 is a diagrammatic representation of the whole of a pipeline which is to be monitored for leaks in accordance with the present invention, and FIG. 2 is a diagrammatic representation on an enlarged scale of that section of the pipeline of FIG. 1 which has the monitoring device installed therein.

As can be seen from FIG. 1, two containers 1 and 5 are connected together by a pipeline 3,4, of which the major portion 4 is buried within the earth and is therefore not accessible to visual inspection for leaks. The container 1 is connected to the inlet side of a pump 2 for driving liquid through the pipeline to the container 5 under the pressure necessary to overcome the relevant differences in level. Disposed downstream of pump 2, in the left-hand pipeline section 3, is a flowmeter $F_1$ and an automatically actuated valve 6, which is closed when the pump P is not in operation. Also connected to the left-hand pipeline section 3 are temperature and pressure sensitive means T, $P_1$ and $P_2$ and safety valve 8, which opens into a pipe 10 running back to the container 1. The left-hand pipeline section 3 is furthermore connected to the monitoring device, shown generally at 11, through pipes 12 and 13.

Disposed sequentially in the monitoring device 11, i.e. with one placed downstream of another in the order described, are a filter 14, a (fourth) automatically actuated valve 15, a pump 16, a non-return device 17, and a flowmeter FRC provided with a quantity recording device 18. The temperature sensitive means $T_1$ and the pressure sensitive means $P_1$ and $P_2$ are connected to a temperature and pressure recording device 19. Pressure variations, which are registered by the recording device 19, cause adjustment signals to be passed to the automatically actuated valve 15 and to the drive of the pump 16, which, however, ceases to be driven once a certain critical pressure value is registered in the recording device 19. The recording device 19 in turn is electrically connected to an alarm device A, which it causes to be actuated in the event of the pressure falling below that critical value.

Overpressure which may be caused by a rise in temperature can be reliably relieved by means of safety valves 8,9. Needless to say, a minor quantity of liquid emerges from the pipeline upon the relief of overpressure, which, however, need not be measured as it is not necessarily due to a leak in the pipeline.

In the event of the automatic valves 6 and 7 being closed, it is possible for any temperature rise in pipeline 3,4, to produce a pressure rise therein, which may raise the pressure to the value at which the safety valve responds. To avoid this, the monitoring device 11 has an additional recycle line 23 and a (third) automatically actuated valve 20 so disposed therein that the occurrence of a pressure exceeding a certain critical value causes the valve 20 to be opened and causes a certain volume of liquid to be delivered from the left-hand pipeline section 3, through line 13, a filter 21, the flowmeter FRC, the valve 20 and a non-return device 22, to line 12, for as long as is necessary to re-establish the nominal pressure, which then causes the pump 16 to be switched off.

The right-hand pipeline section 3 is furthermore provided, close to container 5, with an automatically actuated valve 7, which is closed when the pump 2 is at standstill, and immediately upstream of the container 5, with a flowmeter $F_2$ and a safety valve 9.

The apparatus of the present invention will now be defined. This is an apparatus suitable for use in carrying out the process of the present invention in connection with a system wherein two containers are connected together by means of a pipeline which is partially buried within the earth and which is provided at its two ends with automatically actuated valves, and wherein a pump for driving liquid through the pipeline is connected downstream of the outlet of a first of the containers, the apparatus causing adjustment signals to be passed to the valves in accordance with operational requirements, in which apparatus: a pipeline (e.g. as at 3 and 4) has a pressure sensitive means (e.g. as at $P_2$) interposed therein between automatically actuated valves (e.g. as at 6 and 7) and is connected to a line (e.g. as at 13) running to a leakage monitoring device (e.g. as at 11), which in turn is connected to a further line (e.g. as at 12) opening into a section (e.g. as at 3) of the pipeline lying between the pump (e.g. as at 2) and the first container (e.g. as at 1); and the leakage monitoring device (e.g. as at 11) is provided with a quantity recording device (e.g. as at 18), with temperature- and pressure-recording means (e.g. as at 19), and with a second pump (e.g. as at 16) and a flowmeter (e.g. as at FRC) disposed downstream of the second pump, the quantity recording device being electrically connected to the flowmeter and the drive of the second pump, and the pressure recording means being connected to the pressure sensitive means and to the drive of the second pump.

In preferred embodiments of the apparatus of the present invention, provision is made:

a. for the second pump to be a metering pump which also acts as a flowmeter giving an output in the form of pulses and causing a signal indicating the quantity of material delivered to be passed to the quantity recording device;

b. for the leakage monitoring device to be provided with a recycle line connected in parallel with respect to the second pump, the recycle line having a third automatically actuated valve and a non-return device interposed therein; and third automatically actuated valve being adapted to be opened in the event of the pressure exceeding a predetermined critical value, which is significantly lower than the responding pressure of a safety valve, so as to allow a portion of the liquid from the respective pipeline section to pass through the said line running to the leakage monitoring device, a filter, the flowmeter, the third automatically actuated valve, and the non-return device, to the said further line, for as long as is necessary to re-establish a predetermined nominal pressure, which causes the second pump to be switched off;

c. for a fourth automatically actuated valve to be provided, in the leakage monitoring device, upstream of the second pump;

d. for a second filter to be provided, upstream of the fourth automatically actuated valve; and e. for the quantity recording device to be electrically connected to an alarm device.

In order to enable a pipeline to be reliably tested for leaks during an inoperative period, it is necessary for its two automatically actuated valves (6,7) to be closed tightly. In this situation, the volume of liquid contained in the pipeline (3,4) remains constant at a given temperature, and the quantity of liquid actually contained in it is known under the particular pressure prevailing. Thus any temperature-responsive change in volume of the quantity of liquid in the pipeline (3,4) is kept within certain limits. More particularly, however, the pressure increases or decreases with increasing or decreasing temperatures, respectively, as the case may be.

The pressure prevailing in the pipeline (3,4) should not be allowed to fall to a value equal to the vapour pressure of the liquid contained therein. If this actually occurs, the liquid in pipeline (3,4) must be expected to evaporate and produce a volume of vapour which is likely to produce hazardous pressure shocks, upon the actuation of pump 2. To avoid this, a preferred embodiment of the apparatus of the present invention (as mentioned at (c) above) provides for a fourth automatically actuated valve (15) to be provided in the leakage monitoring device (11), upstream of the second pump, this valve being opened, and the second pump 16 being actuated, in the event of the pressure in the pipeline (3,4) approaching a lower critical value, which is determined by pressure sensitive means $P_2$ and registered in pressure recording device 19. In this manner, it is possible for the pressure prevailing in the pipeline (3,4) to be increased by introducing substitute liquid thereinto, from the container 1. If, regardless of the supply of substitute liquid, the pressure continues to decrease, or if it is necessary to supply more liquid than would be called for by the decrease in pressure of the liquid in the pipeline (3,4), it can reasonably be inferred that the pipeline is leaky. In this event, it is possible for the magnitude of the leak to be inferred from the quantity of substitute liquid introduced per unit time into the pipeline (3,4).

By measuring the temperature of the liquid downstream of the pump P, the temperature at which the liquid enters the respective pipe section 3 is known. Also known are the earth temperature in the vicinity of the buried pipe section 4, and the relevant additional factors, which may vary with the seasons, such as those due to river or canal crossings or to parallel pipelines. It is accordingly unnecessary for the buried pipe section 4 to be provided, distributed along its length, with a plurality of temperature test points.

The quantity of liquid travelling through the flowmeter $F_2$ in the right-hand pipeline section 3 should be equal to that travelling through the flowmeter $F_1$ in the left-hand pipeline section 3, plus or minus that which is supplied, or discharged, respectiely, through the flowmeter (FRC). If this is not the case, the pipeline (3,4) is leaky.

The following Example illustrates the manner in which the quantity of substitute liquid introduced in accordance with this invention is determined.

EXAMPLE

Two containers (1,5) were connected together by means of a pipeline (3,4) having an internal diameter of 100 mm. A section, approximately 9 km long, of the pipeline, which was used for conveying acetaldehyde, was buried within the earth. Acetaldehyde has the following physical properties:

Density at 9°C($\gamma^9$)= 0.7930 kg/cubic decimeter
at 10°C($\gamma^{10}$)= 0.7915 ''
mean value ($\gamma^M$) ≅ 0.8 ''
Specific heat ($C_p$)= 0.522 kcal/kg per °C Heat transmission coefficient in respect of acetaldehyde/ pipeline/earth (K)≈2 kcal. per sq. m. per hour per °C.

The pipe section 4 buried within the earth had an approximate capacity of 67 m³ and an approximate surface area of 3000 m². A temperature drop of the 67 m³ of acetaldehyde contained in pipe section 4 from 10°C to 9°C causes the following decrease in volume:

$$-\Delta V = 67 \cdot 1000 \cdot (0.7930-0.7915) = 100.5 \text{ dm}^3/°C.$$

The acetaldehyde in pipe section 4 contains the following quantity of heat:

$$I = 67 \cdot 1000 \cdot 0.8 \cdot 0.522 \approx 28{,}000 \text{ kcal/°C}.$$

The quantity of heat transmitted from the acetaldehyde to the earth is determined as follows, for a mean difference in temperature of 3°C between the earth, pipe section 4 and acetaldehyde:

$$Q = F \cdot \Delta t \cdot K = 3000 \cdot 3 \cdot 2 \approx 18{,}000 \text{ kcal/h}.$$

The following time is necessary to cool the entire quantity of acetaldehyde contained in pipe section 4 by 1°C at the above temperature difference (about 3°C):

$$I/Q = 28{,}000/18{,}000 \approx 1.55 \text{ h}$$

As a result, it is necessary at the above temperature drop for pipe section 4 to be supplied per hour by means of pump 16 and during an inoperative period with the following quantity of acetaldehyde:

$$\Delta V/h = 100.5/1.55 \approx 65 \text{ dm}^3$$

so as to maintain the pressure prevailing therein.

If the difference in temperature between the earth, pipe section 4 and acetaldehyde is smaller than indicated above, it is naturally possible for the pressure to be maintained by feeding a lesser quantity of substitute liquid into pipe section 4. The quantity of substitute liquid to be supplied should be zero in those cases in which the temperature has equalized. If it is not, the pipeline may be inferred to be leaking, assuming that valves 6 and 7 are completely tight.

We claim:

1. A process for testing liquid-conveying pipelines for leaks during inoperative periods, which comprises: hermetically closing the pipeline at its two ends; continuously measuring the pressure prevailing in the interior of the pipeline; introducing into the closed pipeline, upon the pressure prevailing therein being found to drop, a substitute liquid similar to that normally conveyed therethrough, the substitute liquid being introduced in the quantity necessary to make up for that decrease in volume of the normally conveyed liquid which is caused by the relevant temperature drop, and an alarm device being actuated if the pressure continues to drop; and, upon the actuation of the alarm device, ascertaining the size of the leak as an inference from the quantity of substitute liquid introduced per unit time into the closed pipeline.

2. An apparatus for testing liquid-conveying pipelines for leaks during inoperative periods in connection with a system wherein two containers are connected together by means of a pipeline which is partially buried within the earth and which is provided at its two ends with automatically actuated valves, and wherein a pump for driving liquid through the pipeline is connected downstream of the outlet of a first of the containers, the apparatus causing adjustment signals to be passed to the valves in accordance with operational requirements, in which apparatus: a pipeline has a pressure sensitive means interposed therein between automatically actuated valves and is connected to a line running to a leakage monitoring device, which in turn is connected to a further line opening into a section of the pipeline lying between the pump and the first container; and the leakage monitoring device is provided with a quantity recording device, with termperature- and pressure-recording means, and with a second pump and a flowmeter disposed downstream of the second pump, and the pressure-recording means being connected to the pressure sensitive means and to the drive of the second pump.

3. An apparatus as claimed in claim 2, wherein the second pump is a metering pump which also acts as a flowmeter giving an output in the form of pulses and causing a signal indicating the quantity of material delivered to be passed to the quantity recording device.

4. An apparatus as claimed in claim 2, wherein the leakage monitoring device is provided with a recycle line connected in parallel with respect to the second pump, the recycle line having a third automatically actuated valve and a non-return device interposed therein; the third automatically actuated valve being adapted to be opened in the event of the pressure exceeding a predetermined critical value, which is significantly lower than the responding pressure of a safety valve, so as to allow a portion of the liquid from the respective pipeline section to pass, through the said line running to the leakage monitoring device, a filter, the flowmeter, the third automatically actuated valve, and the non-return device, to the said further line, for as long as is necessary to re-establish a predetermined nominal pressure, which causes the second pump to be switched off.

5. An apparatus as claimed in claim 2, wherein a fourth automatically actuated valve is provided, in the leakage monitoring device, upstream of the second pump.

6. An apparatus as claimed in claim 2, wherein a second filter is provided, upstream of the fourth automatically actuated valve.

7. An apparatus as claimed in claim 2, wherein the quantity recording device is electrically connected to an alarm device.

* * * * *